Oct. 28, 1969  K. L. KEARNS  3,474,909

DEVICE FOR SEATING FILTER PLATES

Filed March 14, 1968  2 Sheets-Sheet 1

INVENTOR.
Kenneth L. Kearns
BY J. Dean Clausen
AGENT

United States Patent Office 3,474,909
Patented Oct. 28, 1969

3,474,909
DEVICE FOR SEATING FILTER PLATES
Kenneth Lee Kearns, Zionsville, Ind., assignor to The Dow Chemical Company, Midland, Mich., a corporation of Delaware
Filed Mar. 14, 1968, Ser. No. 713,049
Int. Cl. B01d 25/14, 25/12
U.S. Cl. 210—232                                    6 Claims

ABSTRACT OF THE DISCLOSURE

This invention relates generally to horizontal plate filters. More specifically, the invention concerns a device useful in the assembly or set up of the filter frame stack in a horizontal plate filter.

---

The filter apparatus with which this invention is generally employed is described in U.S. Patent No. 2,278,453 and is commonly referred to in the art as a Sparkler filter. The filter as described in the aforementioned patent is a horizontal plate filter, which consists in general of a circular tank having a series of filter frames, stacked one on top of another in horizontal fashion within the tank, with a suitable filter media, such as paper, fabric, wire cloth, asbestos, or the like, being sandwiched between each filter frame. In one conventional model of this filter apparatus, the filter frame stack is held in operating position by several long bolts, or tie down rods. The head ends of the tie down rods engage lugs spaced around the periphery of a hold-down ring seated against the filter pad on top of the uppermost filter frame, while the opposite ends of the rods are threadedly secured to a scavenger plate sandwiched between the lowermost filter frame and the bottom of the filter tank.

Filters of the type described herein are generally used for filtering various undesired substances from liquids such as varnishes, wines, syrups, oils and the like. In a particular application in the biological field the heme constituent in various human blood fractionation products, such as gamma globulin and albumin, is removed by filtration in a filter apparatus of this type.

Since the albumin is generally injected intravenously into the human body, whereas the gamma globulin is administered intramuscularly, it is necessary to remove substantially more of the heme constituent from the albumin fraction than from the globulin fraction. To accomplish satisfactory removal of heme from albumin, therefore, two filter pads are sometimes placed between each of the filter frames, thus substantially increasing the height of the filter frame stack. Because of the additional height of the filter frame stack, the tie down rods which secure the stack in operating position by engaging the hold down ring on top of the stack with a threaded base member on the scavenger plate underneath the lowermost filter frame, are usually not long enough for the threaded ends of the rods to adequately engage the base member. When attempting to engage the threaded ends of the rods with the scavenger plate, therefore, the operator usually exerts downward pressure with his hand on one side of the hold down ring to engage one of the rods on that side of the ring. To engage a rod directly opposite to the one first secured (to obtain an even "fit" of the rods) the operator then presses downwardly in the same fashion on the directly opposed side of the hold down ring. This same procedure is repeated in tightening down each of the several tie down rods generally found on horizontal plate filters of this type.

The above described procedure for setting up the filter frame "stack" in operating position, however, has proved to have several drawbacks. Among these disadvantages are the following:

After the "first" tie down rod is secured in place, the hold down ring is tilted slightly upwardly on the side opposite the "first" rod. A substantial amount of pressure must then be exerted on the upwardly tilted side of the ring in order to engage a rod on that side of the ring. The pressure thus exerted by the hold down ring on the topmost filter pad usually cracks the fragile material of the pad near the point where the hold down ring contacts the pad. Similarly, the pressure applied to the hold down ring will carry downwardly to each filter frame in the stack and thus onto the pads sandwiched between the frames, so that a number of cracks are likely to appear on various pads in the stack. The overall result is that a substantial portion of the impurity which the filter pad is designed to collect will pass through the cracks in the pad and be discharged from the filter apparatus as a contaminant in the desired end product.

Secondly, after securing the "first" tie down rod, any one of the opposing tie down rods will be tilted at an angle because of the upward inclination of the hold down ring, so that it is extremely difficult to thread the opposing rod into its mating base member in the scavenger plate. Attempts to secure the tie down rods under these conditions usually result in stripped threads on both the tie down rod and its corresponding base member.

Thirdly, in exerting pressure on the hold down ring to bring it down to the point where the tie down rod can adequately engage the base member on the scavenger plate, the operator's hand will frequently rub against the topmost filter pad. This, of course, results in contaminating the pad with perspiration or other substances which may be picked up by the solution being filtered. Such contaminating materials are particularly undesirable in medicinal products (such as gamma globulin and albumin) which are normally required to be relatively free of pathogenic materials.

Broadly stated, it is a principal object of this invention to provide a device useful in the set up of a filter frame stack in a horizontal plate filter.

A more specific object of this invention is to provide a tool for evenly seating the filter pads in a horizontal plate filter to avoid rupturing the pads during assembly of the filter frame stack.

Still another object of this invention is to provide a tool for seating the filter pads in a horizontal plate filter which aids the operator in avoiding undesirable contamination of the filter pads.

Other objects and advantages of the invention will be apparent from reference to the following description, taken in conjunction with the accompanying drawing in which.

Figure 1:
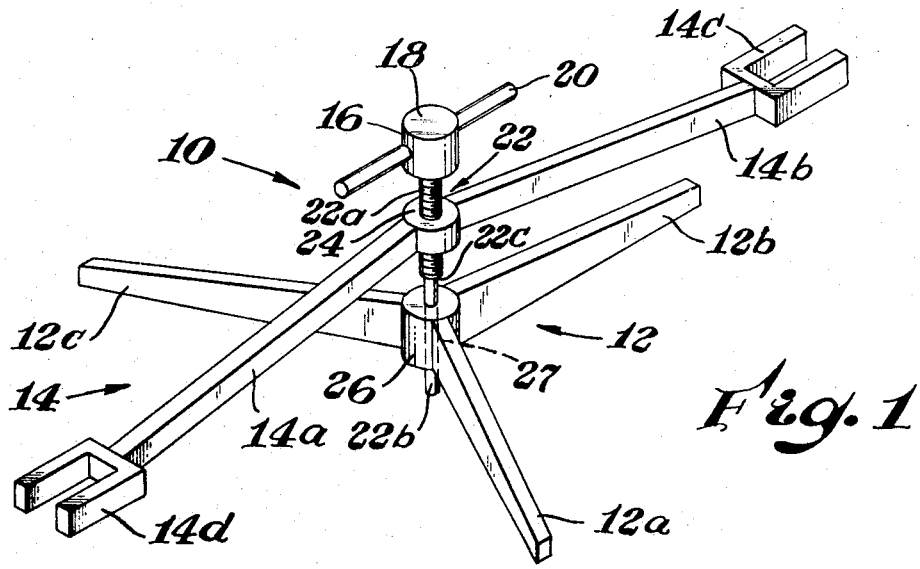
FIG. 1 is a view in perspective of a tool for seating filter pads in a horizontal frame filter according to a preferred embodiment of this invention. The view shown in FIG. 1 is partially exploded to more clearly illustrate the working relationship of the component parts of this tool.

The invention can be better understood from the following description taken in conjunction with the accompanying drawing. The drawing illustrates only one of numerous embodiments within the scope of this invention and the form shown is selected for convenient illustration and clear demonstration of the principles involved. Corresponding parts of the embodiment illustrated herein are designated with the same numerals.

Referring to the drawings, and particularly to FIG. 1, numeral 10 refers generally to a preferred embodiment of a seating tool according to this invention. Seating tool 10 is comprised basically of three components parts, namely, a multi-legged spider member 12, an arm press 14, and a screw lead 16. Screw lead 16 includes a generally solid hub member 18 having a handle 20 inserted generally horizontally through the hub and a screw rod 22 secured to the hub and extending generally vertically downwardly therefrom. Screw rod 22 includes an upper threaded portion 22a (the portion secured to hub 18) and a lower unthreaded portion of smaller diameter than the threaded portion, which defines a pilot pin 22b integral with the threaded portion. Since pin 22b is of smaller diameter than threaded portion 22a, a flat shoulder 22c is formed at the juncture of the pin with the threaded portion. Arm press 14 consists basically of two elongated arms 14a, 14b which extend generally horizontally and in opposing relation from a central hub member 24, the hub member having a centrally positioned, internally threaded hole therein adapted for threaded engagement with portion 22a of screw rod 22. Integral with and positioned at the distal ends of arms 14a and 14b are yoke members 14c and 14d. Spider 12 comprises basically a central hub 26 having three legs 12a, 12b and 12c, which are equidistantly spaced around and extend generally horizontally from the hub. A centrally positioned guide hole 27 in hub 26 is adapted for frictional engagement of pilot pin 22b, the hole being of such diameter as to allow pin 22b to rotate freely therein.

Figure 3:
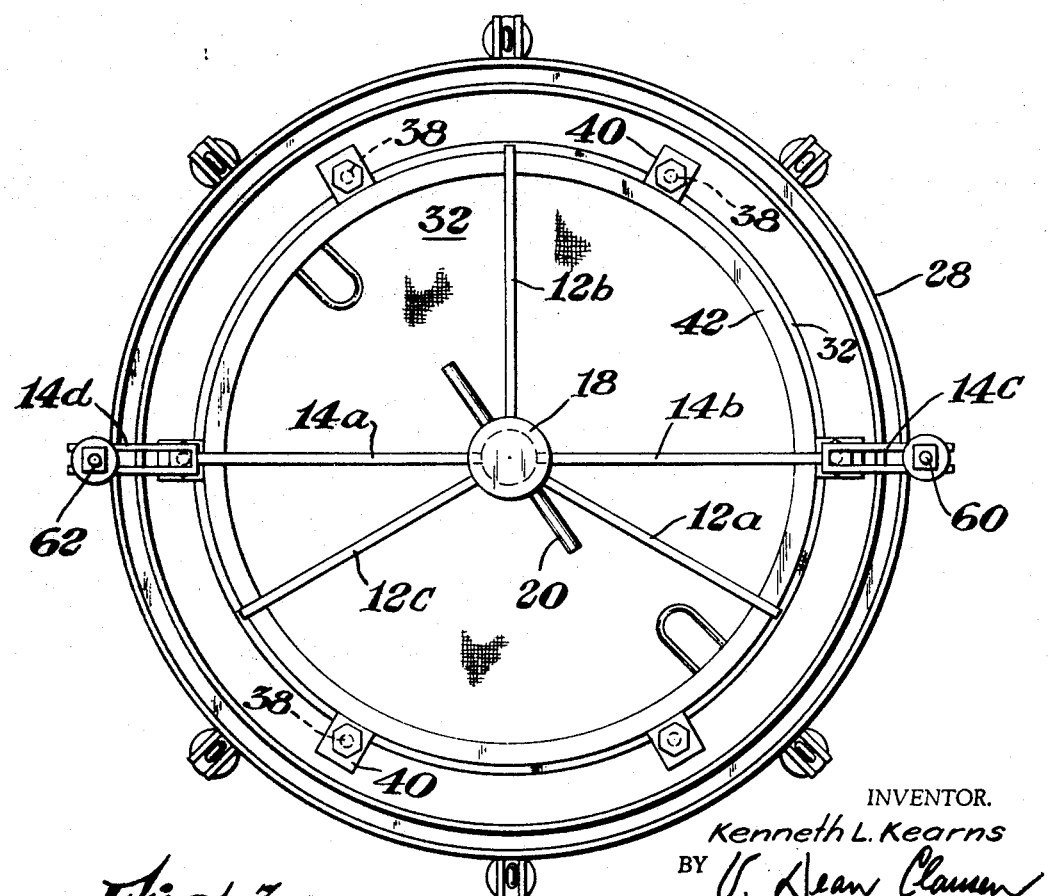
FIG. 3 is a plan view of the seating tool as it would appear when mounted in the operating position illustrated in FIG. 2.
Figure 2:
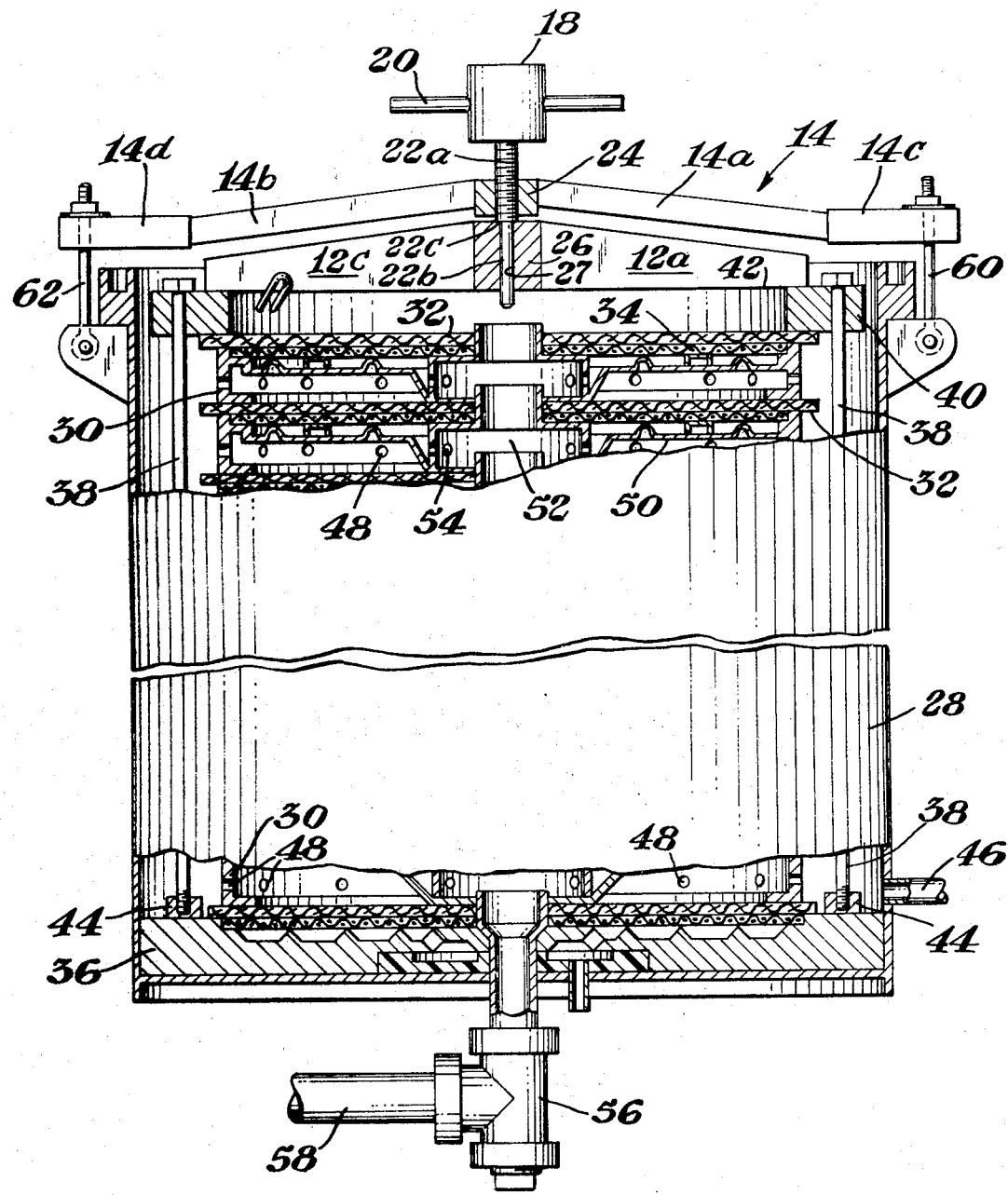
FIG. 2 is a vertical elevation view, partly in section, of a conventional horizontal plate filter with the seating tool shown mounted in operating position on the filter.

Reference is made to FIGS. 2 and 3 with respect to illustrating the operation of seating tool 10 in providing a means for evenly seating the filter pads in a horizontal plate filter. Since the general construction and operation of a typical horizontal plate filter is well known (as outlined in U.S. Patent 2,278,453 mentioned hereinabove) the brief description of the filter operation which follows is considered sufficient to adequately explain the application of the seating tool of this invention as a useful aid in setting up the filter for operation. In the embodiment shown in FIGS. 2 and 3 there is illustrated a conventional horizontal plate filter which, in general, comprises a circular tank 28 having a series of filter frames 30, stacked one on top of another in horizontal fashion within the tank, to constitute a filter frame stack. Sandwiched between each filter frame is a suitable filter pad 32 and a perforated metal filter screen 34 underlying each filter pad. The filter pad and screen underlying the lowermost filter frame are supported by a scavenger plate 36 which lies against the bottom of tank 28. The series of filter frames 30, which constitute the filter frame stack, are held in alignment, i.e. in operating position, by several elongated bolts, designated as tie down rods 38. As will be observed from the drawing, the head ends of tie down rods 38 engage lugs 40 spaced around the periphery of a hold down ring 42, which bears against the filter pad seated on top of the uppermost filter frame, while the opposite ends of the tie down rods, which are threaded, engage internally threaded boss members 44 affixed to scavenger plate 36, which lies against the bottom of filter tank 28.

A liquid or solution to be filtered enters filter tank 28 under pressure through a spigot 46 and rises in the tank until some liquid is distributed in each filter frame 30 by entry through openings 48 in the frames. The amount of solution admitted to filter tank 28, as required for an efficient filtering operation, is determined in part by the capacity of the tank and by a pressure gauge and an air release petcock carried in an air tight lid (not shown), which is mounted on the tank prior to charging the tank with the liquid. In a typical filtering operation the solution in each filter frame 30 passes through the filter pad 32 and filter screen 34 which lie directly beneath the frame, with the undesired material in the solution being collected on the filter pad during passage of the liquid therethrough. The filtered solution then drops onto a ledge 50 of the next lower filter frame, the ledge being inclined downwardly to form a junction with a centrally positioned hollow tubular hub 52, which is seated on a lower face of the ledge. At this point the filtered solution passes through openings 54 in the hub wall and drops downwardly through the bore of each hub on the next lower level and eventually passes out of filter tank 28 through an appropriate fitting 56 mounted at the bottom of the tank and coupled to an outflow line 58.

To set up a filter stack for operation in a horizontal plate filter according to the practice of this invention, a typical procedure is as follows. The several frames, pads, screens and tubular hubs which make up the individual filter frame units are loosely assembled within the filter tank in the manner described hereinabove to form the complete filter frame stack. At this point hold down ring 42 is seated on top of the uppermost filter pad and tie down rods 38 are placed loosely in lugs 40 so that the threaded ends of the rods are in general alignment with their corresponding boss members 44 on scavenger plate 36. Seating tool 10, in loosely assembled relation, is then placed on hold down ring 42 so that the lower edge of legs 12a, 12b and 12c of spider 12 rest firmly on the upper edge of the hold down ring and shoulder 22c of screw rod 22 rests flush against the upper face of hub 26. Arm press 14 is then screwed downwardly on threaded portion 22a of screw rod 22 to the point where yoke members 14c, 14d can engage hold down bolts 60 and 62. The nuts on bolts 60 and 62 are then tightened down against the yoke members to clamp arm press 14 securely in place. As indicated in FIG. 3, bolts 60 and 62 are two of the several bolts mounted on the rim of filter tank 28, which are used to secure a lid to the tank during actual operation of the filter. In order to adequately engage the yoke members of arm press 14, bolts 60 and 62 are slightly longer than the other bolts on the rim of the tank. After arm press 14 is secured, handle 20 on screw lead 16 is rotated in clockwise fashion to apply downward pressure against spider 12 through shoulder 22c which bears against hub 26. The pressure thus applied is transmitted equally through legs 12a, 12b and 12c so that it is evenly distributed at three separate equidistantly spaced points on hold down ring 42. In this manner hold down ring 42 is gradually forced down to a point where the threaded ends of tie rods 38 can be threadedly secured to the corresponding boss members 44 in scavenger plate 36. Once the tie rods are secured in place the filter frame stack is in operating position. Seating tool 10 is then removed from the filter apparatus by releasing hold down bolts 60 and 62 from arm press 14 and revolving handle 20 in a counterclockwise direction.

It will be readily apparent to those skilled in the art that use of the seating tool of this invention in setting up the filter frame stack represents a distinct advantage over the prior procedures. For example, the uniform distribution of pressure which the operator is able to apply to hold down ring 42 alleviates the problem of the ring tilting upwardly on one side after one of the tie rods is secured. This, in turn, avoids cracking the filter pads and stripping the threads when securing the remaining tie rods on the ring. Further, there is no need for the operator to apply hand pressure against the hold down ring, thus eliminating the possibility of contaminating the uppermost filter pad.

While the inventive concept is specifically described in the foregoing specification and in the accompanying drawing, it will be understood that numerous modifications and variations with respect to form, size, arrangement of parts, operation and mechanical details can be made without departing from the spirit or scope of this invention.

What is claimed is:

1. In a horizontal plate filter which comprises in general a filter tank and a filter frame stack within said tank, wherein said filter frame stack includes, in part, a series of filter frames, filter pads, a hold down ring and a scavenger plate; the hold down ring being positioned to rest against the uppermost filter pad in the filter frame stack and including a plurality of tie down rods spaced around the periphery of the ring which engage base members in the scavenger plate; the improvement which comprises a seating tool suitable for setting up the filter frame stack for operation, said seating tool comprising, in combination:

a spider means including a central hub with a plurality of legs integral with and spaced around the hub,
   an arm press means including a central hub with a plurality of arms extending therefrom, said arms having means integral therewith for engaging hold down means mounted on the periphery of the filter tank, and
   screw means for threadedly engaging the hub of said arm press means, the screw means including a shoulder portion defining a pin means integral with and extending from the screw means, said pin means being adapted for frictional engagement with a centrally positioned guide hole in the hub of said spider means, whereby actuation of said screw means causes the shoulder portion thereof to bear against the hub of said spider means, thereby applying an evenly distributed downward pressure through the legs of said spider means to the hold down ring to enable the tie rods to engage the base members in the scavenger plate.

2. The device of claim 1 in which the legs of said spider extend generally horizontally from said hub such that a lower edge of said legs rest flush against an upper edge of the hold down ring at points equidistantly spaced around the ring.

3. The device of claim 1 in which said arm press means has at least two elongated arms integral with and extending generally horizontally from the central hub.

4. The device of claim 3 in which the elongated arms of said arm press include yoke members integral with and positioned at the distal end of said arms for engaging hold down means mounted on the periphery of the filter tank.

5. The device of claim 1 in which said screw means comprises a screw lead including a generally solid hub member having a handle inserted horizontally through said hub and which includes a screw rod secured to and extending generally vertically downwardly from said hub.

6. The device of claim 5 in which the screw means is adapted for threaded engagement with a centrally positioned internally threaded hole in the hub of said arm press means.

References Cited

UNITED STATES PATENTS 2,345,014   3/1944   Stamsvik _____ 210—350 X
2,687,217   8/1954   Kracklauer _____ 210—344

REUBEN FRIEDMAN, Primary Examiner

FRANK A. SPEAR, JR., Assistant Examiner

U.S. Cl. X.R.

210—251, 344, 350